United States Patent [19]
Patel et al.

[11] Patent Number: 5,513,213
[45] Date of Patent: Apr. 30, 1996

[54] DATA-DRIVEN AUTORATING FOR USE IN DATA COMMUNICATIONS

[75] Inventors: Mahendra Patel, Brandon; Robert E. Scott, Indian Rocks Beach, both of Fla.

[73] Assignee: AT&T Corp., Murray Hill, N.J.

[21] Appl. No.: 410,597

[22] Filed: Mar. 27, 1995

Related U.S. Application Data

[63] Continuation of Ser. No. 131,343, Oct. 4, 1993, abandoned.

[51] Int. Cl.⁶ .............................. H04B 1/38; H04B 7/00
[52] U.S. Cl. .................. 375/222; 375/285; 455/33.1
[58] Field of Search .................... 375/222, 377, 375/285, 219, 225; 379/94, 98, 96, 97, 61; 455/33.1, 54.1; 370/24, 26, 29, 30

[56] References Cited

U.S. PATENT DOCUMENTS

| | | | |
|---|---|---|---|
| 4,756,007 | 7/1988 | Qureshi et al. | 375/37 |
| 4,771,416 | 9/1988 | Maxwell et al. | |
| 4,771,417 | 9/1988 | Maxwell et al. | 370/31 |
| 4,910,794 | 3/1990 | Mahany et al. | 455/67.4 |
| 4,937,839 | 6/1990 | Motley et al. | 375/8 |
| 4,956,851 | 9/1990 | Wolensky et al. | 375/8 |
| 5,070,536 | 12/1991 | Mahany et al. | 455/67.4 |
| 5,191,583 | 3/1993 | Pearson et al. | 370/94.1 |
| 5,241,565 | 8/1993 | Kloc et al. | 375/58 |
| 5,247,546 | 9/1993 | Abbiate et al. | 375/121 |
| 5,307,402 | 4/1994 | Cooper | 379/98 |
| 5,349,635 | 9/1994 | Scott | 379/97 |
| 5,404,394 | 4/1995 | Dimolitsas | 379/100 |
| 5,450,438 | 9/1995 | Landry et al. | 375/222 |

*Primary Examiner*—Scott A. Rogers
*Assistant Examiner*—Madeleine Anh-Vinh Nguyen
*Attorney, Agent, or Firm*—Joseph J. Opalach

[57] ABSTRACT

In transmitting information over a cellular communications channel to an opposite endpoint, a modem's autorating routine is "data-driven." In particular, when the amount of information to transmit to the opposite endpoint is low, the modem's data rate is low e.g., 4800 bps, and the modem's ability to autorate upwards, i.e., fallforward, is disabled. However, when the amount of information to transmit to the opposite endpoint is high the modem's ability to fallforward is enabled so that the modem's data rate can increase to the highest permissible data rate for the cellular channel in order to transmit large blocks of information.

12 Claims, 4 Drawing Sheets

SNR THRESHOLD TABLE

| DATA RATE | SNR BAD VALUE | SNR GOOD VALUE |
|---|---|---|
| 1200 | - | - |
| 4800 | 10 | 20 |
| 7200 | 16 | 23 |
| 9600 | 19 | 26 |
| 12,000 | 23 | 28 |
| 14,400 | 25 | N/A |

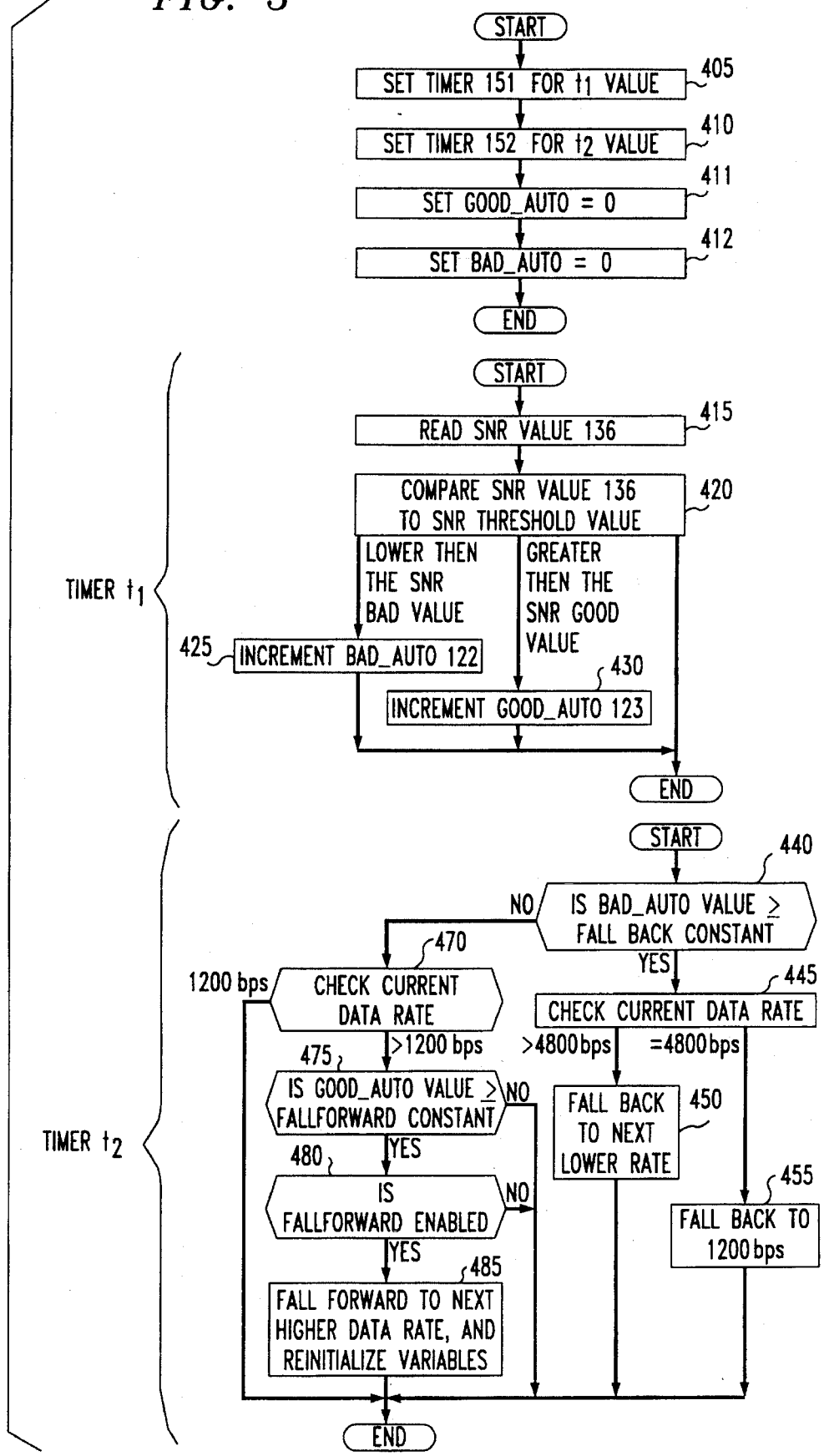

DATA-DRIVEN AUTORATING FOR USE IN DATA COMMUNICATIONS

This application is a continuation of application Ser. No. 08/131,343, filed on Oct. 4, 1993, abandoned.

BACKGROUND OF THE INVENTION

The present invention relates to data communications and, more particularly, to mobile data communications.

A mobile data communications channel is sometimes referred to as an "impaired channel" since it is affected by a number of channel impairments like Rayleigh fading, co-channel interference, etc., that increase the error rate and, thus, degrade the overall performance of the mobile data connection. One form of mitigating the affects of an impaired channel is to simply apply land-line modem standards to the mobile radio environment.

In the land-line modem arena, International Telephone and Telegraph Consultative Committee (CCITT) standard V.32bis is a representative modulation standard. In V.32bis, during the "start-up mode," or "connection phase," both modems, or endpoints, establish the data connection, e.g., perform a "handshaking" sequence to establish the modulation standard, error control, and the data rate. After the start-up mode, the "data mode," or "communications phase" is entered in which data, or information, is exchanged between the two modems over the mobile data communication channel. One of the features of V.32bis is the ability to sequentially, and automatically, "autorate" upwards or downwards between 4800 bits per second (bps) and 14400 bps during either the start-up mode or the data mode as a function of the error characteristics of the communications channel. For example, if a land-line data connection is initially established between two modems at 14400 bps and the error rate subsequently increases beyond a predetermined threshold, one of the modems will negotiate a data rate change down to the next lowest data rate. In this example, the data rate would change from 14400 bps to 9600 bps. At the latter data rate, information is then transmitted for a period of time to monitor the resulting error rate. If the error rate is still above a predetermined threshold, one of the modems will, again, negotiate a data rate change down to 4800 bps. On the other hand, if the error rate decreases for a period of time while transmitting data at 9600 bps, one of the modems will negotiate a data rate change to the next highest data rate, i.e., from 9600 bps to 14400 bps. In either event, this "error-based" autorate feature takes advantage of the fact that the error rate of a communications channel is typically also a function of the data rate, i.e., the higher the data rate, the likelihood of an error increases.

Thus, in the context of a mobile data communications channel, the land-line autorate feature is used to assist in mitigating the affect of an impaired channel on the communication of information between two modems. If transmitting at 9600 bps and the error rate decreases for a period of time below a predetermined threshold, one of the modems will negotiate a data rate change to 14400 bps in an attempt to improve the data throughput of the mobile data communications channel. Consequently, if the channel condition permits it, a modem will automatically "fallforward," i.e., increase its data rate.

However, in a rapidly changing environment like the cellular environment, a high data rate, e.g., 9600 bps, increases user frustration during "interactive sessions" due to the higher probability of transmission errors. During interactive sessions a user only occasionally sends data—yet any error is immediately seen and felt by a user. For example, a user may send their "password" to the far-end endpoint to "login" to a distant computer facility. Since these occasional data transmissions are subject to a higher probability of error due to the high data rate, a user may experience delays because the modem's error-control routine may have to re-send data.

SUMMARY OF THE INVENTION

We have discovered a method and apparatus that further improves the overall performance of a mobile data communications channel. In particular we have realized that autorating should also be "dam-driven." In dam-driven autorating, a change in the data rate is performed as a function of how much data the user wants to transmit. In other words, a modem will remain at a low speed, or low-level, until the amount of data requires a higher speed for transmission—which results in better user performance.

In an embodiment of this invention, a modem transmits information over a cellular communications channel to an opposite endpoint. When the mount of information to transmit to the opposite endpoint is low, the modem's data rate is low, e.g., 4800 bps is the low-level data rate, and the modem's ability to autorate upwards, i.e., fallforward, is disabled. However, when the mount of information to transmit to the opposite endpoint is high, the modem's ability to fallforward is enabled so that the modem's data rate can increase to the highest permissible data rate for the cellular channel in order to transmit large blocks of information. This results in the modem effectively switching between an "interactive mode," with a concomitant low data rate, and a "file transfer" mode, with a higher data rate.

Also, the inventive concept as described above supports "split-rates" between the modem endpoints. For example, when transmitting in accordance with CCITT V.32bis, one modem can be in the interactive mode and transmit dam at 4800 bps—yet that modem can also be receiving data at 14400 bps from the opposite endpoint, which is in the file transfer mode.

BRIEF DESCRIPTION OF THE DRAWING

FIG. 5 is a flow diagram of an error-based autorating method controlled by the dam-driven autorating method of FIG. 4.

DETAILED DESCRIPTION

Figure 1:
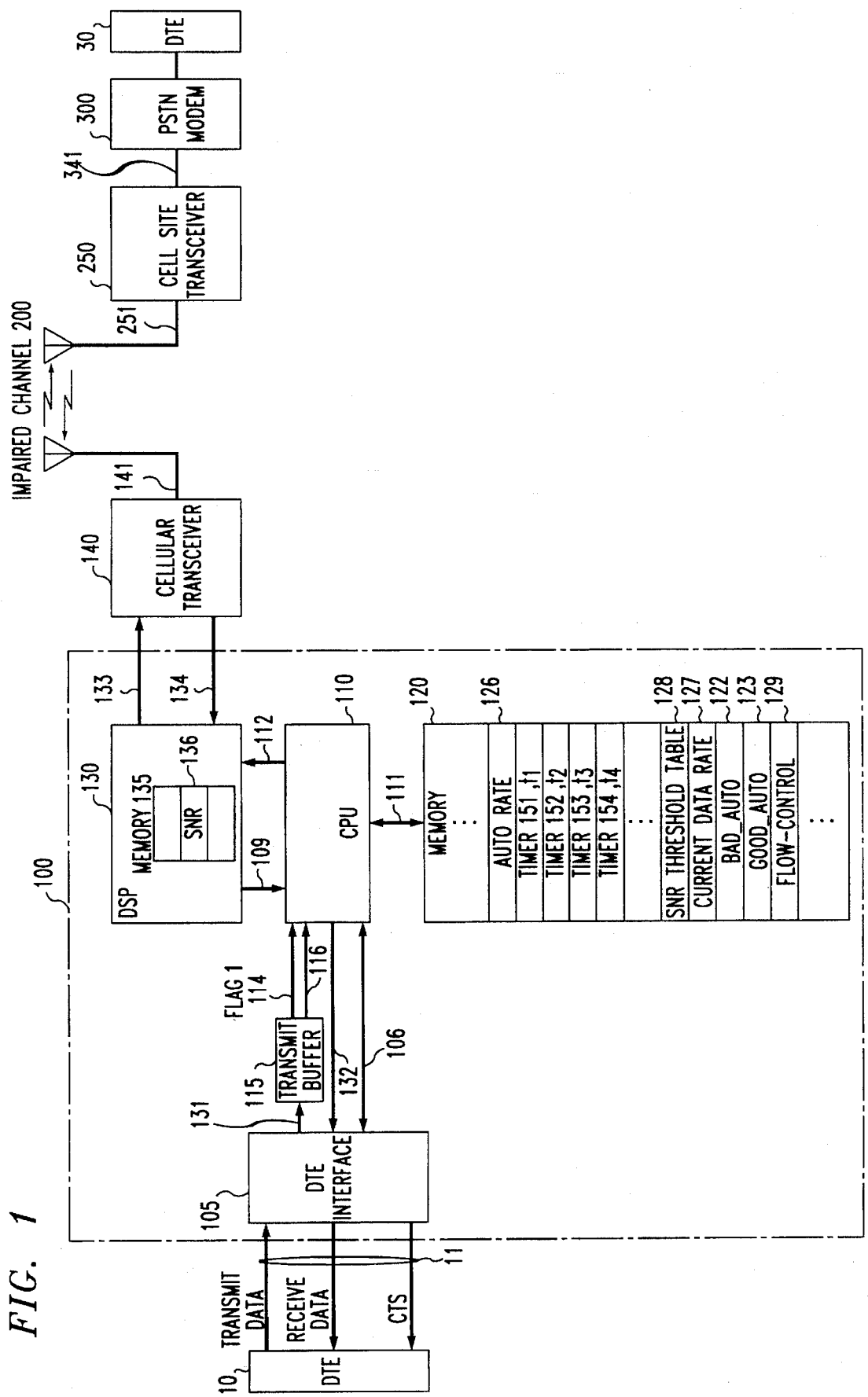
FIG. 1 is a block diagram of a mobile data communications system that includes a cellular modem embodying the principles of the invention.

FIG. 1 shows a block diagram of a mobile data communications system that includes a cellular modem, which embodies the inventive concepts of this invention. As shown, cellular modem 100 is coupled to cellular transceiver 140 for transmitting to, and receiving information from, PSTN modem 300 via cell site transceiver 250, impaired channel 200, and public switched network facility 341. The latter includes a Mobile Telecommunications Switching Office (MTSO), etc., for establishing a PSTN connection to PSTN modem 300. Both cellular modem 100 and PSTN modem 300 are also coupled to respective data terminal equipment 10 and 30. For the purposes of the following description, it is assumed that cellular modem 100 and PSTN modem 300 are similar in design, i.e., they both embody the inventive concept.

Generally speaking, the following is a brief overview of the operation of cellular modem 100 for transmitting and receiving data. A data signal for transmission to PSTN modem 300 is applied to data terminal equipment (DTE) interface 105, via interface 11, from DTE 10. Interface 11 represents a collection of signals as specified in Electronic Industry Association (EIA) standard RS-232, which is a standard for interconnecting data terminal equipment to data communications equipment. A subset of these signals is shown within interface 11. The data signal for transmission is represented by the "transmit data" signal that is applied to DTE interface 105. The latter receives the transmit data signal and stores the information, or data, represented by this signal in transmit buffer 115. CPU 110, via line 116, extracts the stored transmit data and formats this transmit data as is known in the art to provide a formatted data signal, via line 112, to digital signal processor (DSP) 130. The latter modulates this formatted data signal and provides a modulated data signal to cellular transceiver 140, which further modulates and transmits this modulated data signal to cell site transceiver 250 on a predefined cellular carrier signal via antenna 141. Similarly, antenna 141 receives a modulated cellular carrier signal transmitted by cell site transceiver 250, and provides this signal to cellular transceiver 140. The latter demodulates this received modulated cellular carrier signal and provides a received modulated data signal to DSP 130 via line 134. DSP 130 demodulates the received modulated data signal and provides a formatted received data signal on line 109 to CPU 110. The latter then provides the received data signal to DTE 10 via DTE interface 105 and line 132. It is assumed for simplicity that line 132 also represents a receive buffer similar to the transmit buffer described above. The received data signal represents information transmitted by DTE 30 to DTE 10 via PSTN modem 300, PSTN facility 341, and cell site transceiver 250.

DSP 130 comprises DSP memory 135 for providing a number of storage locations, like signal-to-noise ratio (SNR) value 136, which are accessible to CPU 110 via line 109, i.e., lines 109 and 112 carry both control and data signals. DSP 130 periodically stores or updates SNR value 136 by measuring the received modulated data signal's mean-squared-error (MSE) and converting this measured MSE to an approximate SNR value, which is then stored in the respective memory location of DSP memory 135. The relation between MSE and SNR is usually developed empirically by a priori experimentation. CPU 110 is a micro-processor based central processing unit which operates on, or executes, program data stored in memory 120 via line 111, which is representative of control, address, and data signals (not shown). The program data is represented by autorate subroutine 126, timers 151 through 154, SNR threshold table 128, and the variables: current data rate 127, bad_auto 122, and good_auto 123 (described below). Timers 151 through 154 represent "software timers," each providing an indication of the expiration of time intervals $t_1$, $t_2$, $t_3$, and $t_4$, respectively.

Figure 2:
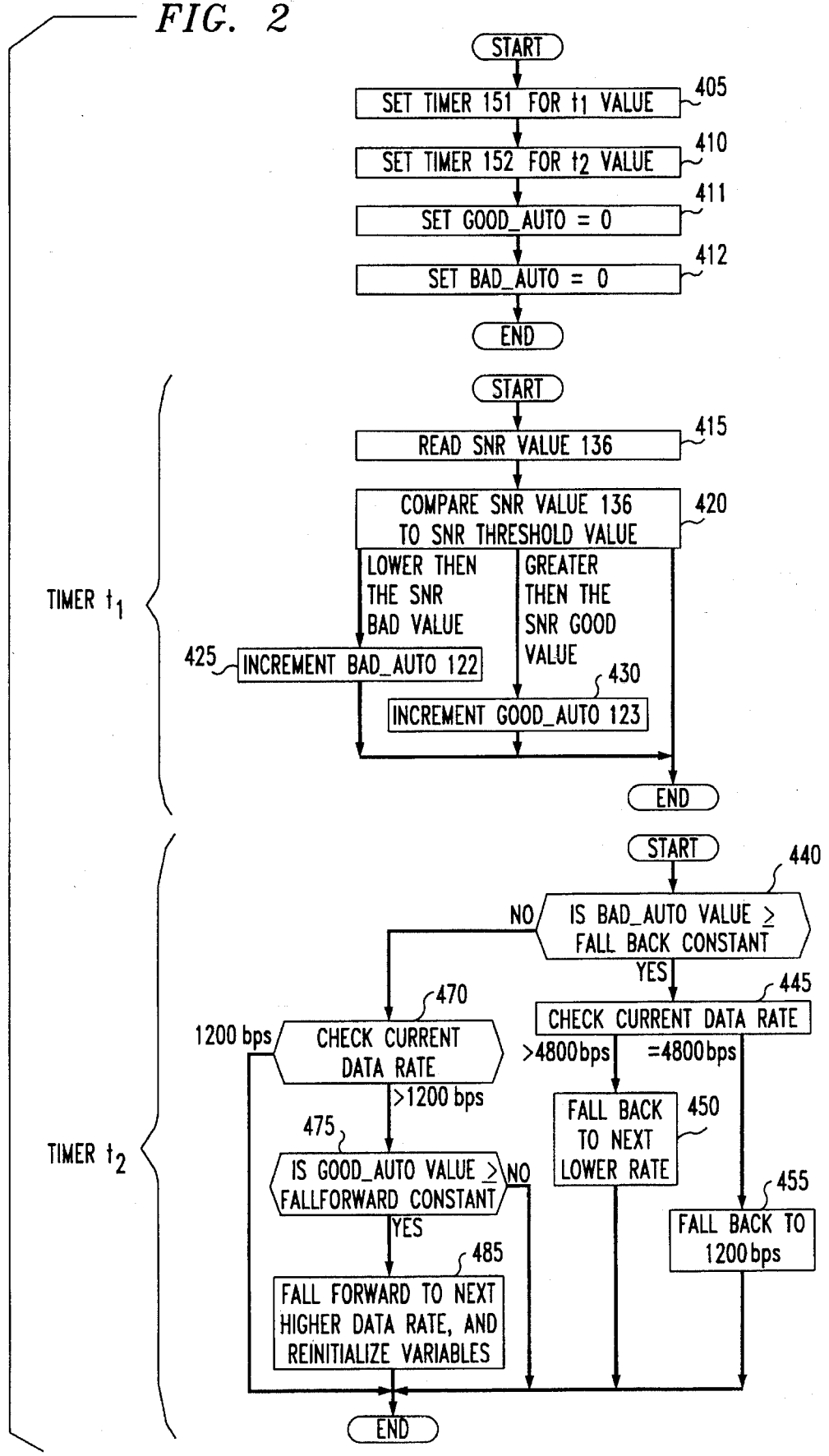
FIG. 2 is a flow diagram of an illustrative error-based autorating method for use in the modem of FIG. 1.

Reference should now be made to FIG. 2, which illustrates a method for "error-based" autorating. In this method, it is assumed that cellular modem 100 is in the data mode of operation, i.e., cellular modem 100 and PSTN modem 300 are transmitting data, or information, to each other. As mentioned above, an error-based autorating routine varies the data rate as a function of the error characteristics of the communications channel. Although any prior art error-based autorating routine can be used, FIG. 2 is a flow diagram of an error-based autorating method disclosed in the co-pending U.S. patent application of Landry et al. entitled "A 1200 Bit per Second Fallback Method for use in Mobile Radio," Ser. No. 08/096,541, filed on Jul. 23, 1993.

In the method of FIG. 2, CPU 110 first initializes timers 151 and 152. In step 405, CPU 110 sets timer 151 to expire after time period $t_1$, which is illustratively equal to 1 second (sec.). In step 410, CPU 110 also sets timer 152 to expire after time period $t_2$, which is illustratively equal to 30 sec. Then, in steps 411 and 412, CPU 110 initializes the values of good_auto 123 and bad_auto 122, respectively, to zero.

Figures 3, 4:
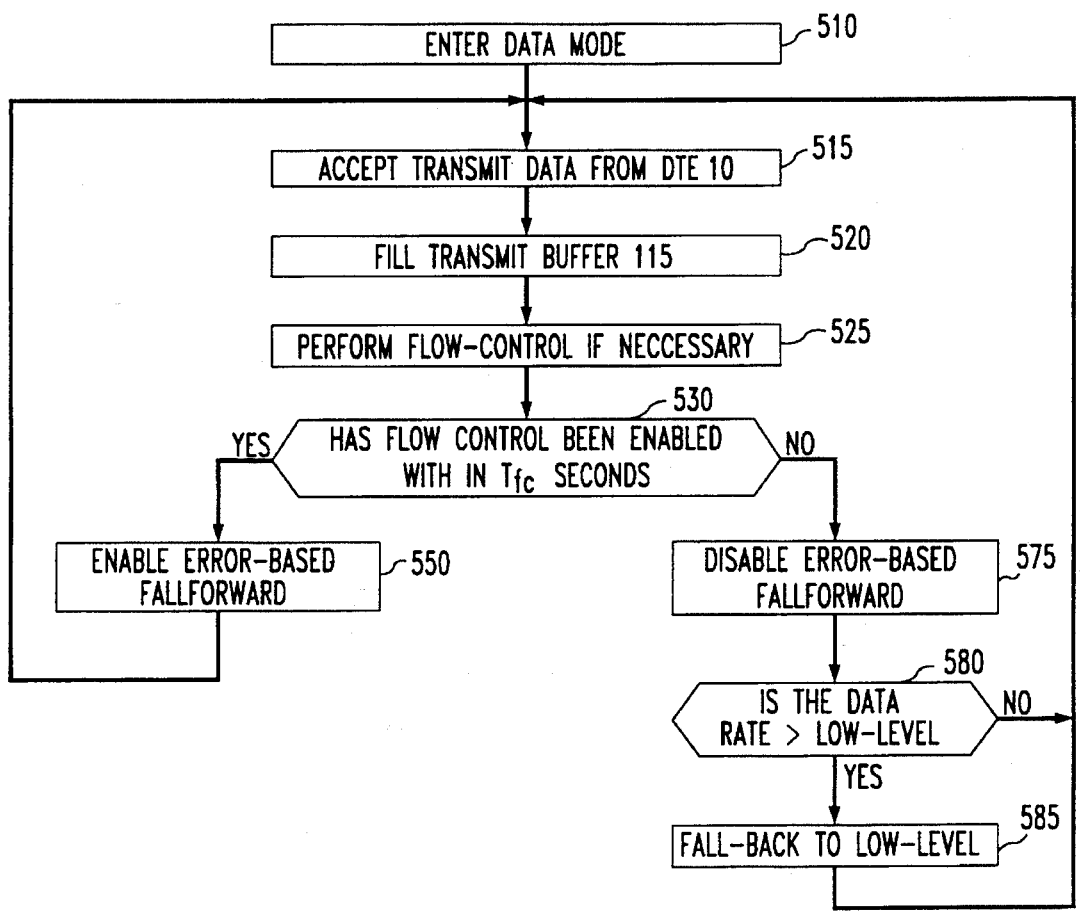
FIG. 3 is a table of signal-to-noise ratio thresholds for use in the method of FIG. 2.
FIG. 4 is a flow diagram of an illustrative data-driven autorating method for use in the modem of FIG. 1.

At the expiration of time period $t_1$, CPU 110 executes step 415 in which CPU 110 reads SNR value 136. In step 420, CPU 110 compares SNR value 136 to an SNR threshold value take from SNR threshold table 128, which is stored in memory 120. An illustrative SNR threshold table is shown in FIG. 3. This table assigns an "SNR bad value" and an "SNR good value" for each data rate. For example, assume that the current data rate, which is stored in memory location 127, is equal to 4800 bps. Then, if SNR value 136 is lower than or equal to the SNR bad value, which at 4800 bps is equal to 10, CPU 110 increments the value of the variable bad_auto 122 stored in memory 120 in step 425. On the other hand, if SNR value 136 is higher than or equal to the SNR good value, which at 4800 bps is equal to 20, CPU 110 increments the value of the variable good_auto 123 stored in memory 120 in step 430. However, if SNR value 136 is greater than the SNR bad value but less than the SNR good value, CPU 110 does not alter the values stored in good_auto 123 and bad_auto 122. This comparison process is performed by CPU 110 at the expiration of every period of time $t_1$ during the data mode of operation.

Upon the expiration of time $t_2$, CPU 110 executes step 440. If the value of variable bad_auto 122 is greater than or equal to a predefined FALLBACK constant, e.g., 10, then CPU 110 executes step 445 and checks the value of current data rate 127. If the value of current data rate 127 is greater than 4800 bps, then CPU 110 falls back to the next lower data rate in step 450. However, if the value of current data rate 127 is equal to 4800 bps, then CPU 110 negotiates a fallback directly to 1200 bps in step 455. Note, for falling back to 1200 bps, one may want to user a larger value for the fallback constant.

Alternatively, if the value of variable bad_auto 122 is less than the predefined FALLBACK constant, CPU 110 executes step 470. In this step, CPU 110 checks the value of current data rate 127. If the value of current data rate 127 is greater than 1200 bps, then CPU 110 executes step 475, where the value of good_auto 123 is compared to a predefined FALLFORWARD constant, e.g., 20. If the value of good_auto 123 is greater than or equal to 20, then CPU 110 causes cellular modem 100 to fallforward to the next higher data rate, updates the value of current data rate 127, and reinitializes bad_auto 122 and good_auto 123 in step 485. However, if the value of good_auto is less than the FALLFORWARD constant, CPU 110 simply exits the routine. In addition, if the data rate in step 470 is equal to 1200 bps, CPU 110 will bypass step 475 and exit the routine. This is because the modulation standard used at 1200 bps, e.g., CCITT V.22, is very different from the modulation standards used at 4800 bps and higher, e.g., CCITT V.32bis,—with the result that a communications channel that is very good for transmission at 1200 bps, as represented by the value of good_auto 123, may provide poorer communications at 4800 bps. In other words, there is no correlation between the value of good_auto 123 at 1200 bps and the ability to transmit data at the next highest data rate. As a result, a fallforward is possible via other methods not shown in the drawing, e.g., an automatic fallforward once a minute.

As a result of the error-based autorating method described above, cellular modem 100 is continuously monitoring the error characteristics of impaired channel 200. Consequently, cellular modem 100 will automatically fallforward to a higher data rate, e.g., 14400 bps, when the error statistics that are collected by cellular modem 100 meet the above-defined criteria.

However, we have observed that during interactive sessions transmission of data at a high data rate in the cellular environment leads to user frustration. As noted above, a higher data rate results in a higher probability of error for any single transmission. Therefore, in an interactive session any error will be annoying to the user. Further, in an interactive session a user does not need the high bit rate to transfer information. Therefore, we have realized that any autorating routine should also be "data-driven." In data-driven autorating, a change in the data rate is performed as a function of how much data the user wants to transmit. In other words, the modem will remain at a low speed until the amount of data requires a higher speed for transmission—which results in better user performance.

FIG. 4 represents a illustrative method for data-driven autorating. In step 510, cellular modem 100 enters the data mode of operation and in step 515, cellular modem 100 receives data from DTE 10. In this method, data-driven autorating is implemented by monitoring for flow-control. Here, the term "flow-control" refers to the data terminal equipment/data communications equipment interface. Normal interactive screen transfers are not counted as flow control. In step 520, the transmit data from DTE 10 to cellular modem 100 is placed in buffer 115. This buffer illustratively has a capacity of 2K bytes. Buffer 115 provides a signal FLAG1 to CPU 110 on line 114. The FLAG1 signal is active whenever the amount of information stored in buffer 115 reaches a predetermined level, e.g., 90% full. CPU 110 monitors the FLAG1 signal in step 525. When the FLAG1 signal is active, CPU 110 then executes any of the well-known flow-control procedures to reduce the amount of data coming from DTE 10 in step 525. For example, CPU 110 can exert a form of "hardware flow-control" through the "clear to send" (CTS) signal of interface 11. Alternatively, CPU 110 can implement a form of "software flow-control" like "XON/XOFF," which will slow down DTE 10 from providing too much data. When CPU 110 enables a flow-control procedure, CPU 110 sets flow-control register 129 to a logical "one." If CPU 110 disables the flow-control procedure, flow-control register 129 is reset to a logical "zero."

In step 530, CPU 110 checks once every $T_{fc}=10$ seconds if flow-control register 129 is set. If flow-control register 129 is set, CPU 110 then enables the error-based fallforward autorating routine, represented within FIG. 2, in step 550. Once the fallforward autorating routine is enabled, cellular modem 100 has effectively entered a file transfer mode and the fallforward autorating routine will automatically seek the highest dam rate permissible for impaired channel 200.

On the other hand, if a flow-control routine has not been enabled in step 530, then CPU 110 disables the error-based fallforward routine in step 575. CPU 110 then checks the current data rate in step 580. If the current data rate is greater than a predefined low-level, e.g., 4800 bps, then CPU 110 initiates a fallback to 4800 bps in step 585. However, if the current data rate is equal to or less than the low-level, then CPU 110 skips step 585. As a result, cellular modem 100 is effectively in an interactive mode, where data transmissions over impaired channel 200 will occur at a data rate no greater than the low-level data rate.

As described above, the data-driven autorating routine of FIG. 4 controls whether or not the error-based fallforward routine is turned on, via step 550, or off, via step 575. FIG. 5 illustrates a method for enabling or disabling within an error-based autorating routine the fallforward feature. FIG. 5 is the same as FIG. 2 except for the addition of step 480, which is in between steps 475 and 485. In step 480, CPU 110 checks if fallforward is enabled, or not, before any fallforward is attempted. If the error-based fallforward routine is enabled, then CPU 110 attempts a fallforward in step 485. But, if the error-based fallforward routine is disabled, then CPU 110 simply exits the routine. It should be noted that although the error-based autorating routine of FIG. 5 could have been enabled and disabled in its entirety, the ability to fallback was not affected by the method shown in FIG. 4. In addition, the method of FIG. 4 can be further modified to always allow the error-based autorating routine to collect the error statistics in the background. This eliminates any initial time delay in step 550 caused by first having to accumulate the error statistics to determine if a fallforward should occur.

It should also be noted that a data buffer of 2K bytes in size, allows DTE 10 to communicate with cellular modem 100 at a high bit rate, e.g., 19200 bps, or 38400 bps, while cellular modem 11210 communicates at a lower bit rate, e.g., 4800 bps over impaired channel 200. Also, the inventive concept as described above supports "split-rates" between cellular modem 100 and PSTN modem 300. For example, when transmitting in accordance with CCITT V.32bis, cellular modem 100 can be in the interactive mode and transmit data at 4800 bps—yet cellular modem 100 can also be receiving data at 14400 bps because PSTN modem 300 is in the file transfer mode.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, FIG. 4 is only illustrative of one method for implementing data-driven autorating. Other methods can also be performed. As an illustration, CPU 110, of cellular modem 100, can alternatively count the number of times that flow-control has been enabled within a period of time and switch from interactive mode to file transfer mode when the count equals, or exceeds, a predetermined threshold. This count could be performed by accumulating the number of times the FLAG 1 signal, of buffer 115, is active during a period of time.

Also, although described above in the context of a cellular environment, this invention is applicable to any data communications channel, e.g., land-lines. Further, the error-based autorating method of FIG. 2 is merely illustrative, any autorating technique that utilizes error characteristics is applicable.

We claim:

1. An autorating method for use in a modem, the method comprising the steps of:

receiving data from a data terminal equipment for transmission to a far-end modem over a first time interval;

communicating the data over a full-duplex cellular communications channel to the far-end modem at a transmission data rate selected from a range of data rates, where the range has a lowest data rate and a highest data rate;

switching the transmission data rate to a low-speed data rate as a function of the amount of received data over the first time interval; and further adapting the transmission data rate to the quality of the full-duplex communications channel;

wherein the adapting step is prohibited from increasing the transmission data rate beyond a first value as a function of the amount of received data over the first time interval, and where the first value is less than the highest data rate and greater than or equal to the low-speed data rate.

2. The method of claim 1 wherein the step of switching switches to the low-speed data rate when no flow control is performed in the modem and the transmission data rate is greater than the low-speed data rate.

3. The method of claim 2 wherein the adapting step is prohibited from increasing the data rate beyond the first value when no flow control is performed in the modem.

4. The method of claim 1 wherein the step of switching switches to the low-speed data rate when the amount of received data over the first time interval is less than a first predetermined value and the transmission data rate is greater than the low-speed data rate.

5. The method of claim 4 wherein the adapting step is prohibited from increasing the data rate beyond the first value when the amount of received data is less then the first predetermined value.

6. The method of claim 1 wherein the communicating step includes the step of simultaneously receiving a data signal from the far-end modem at a received data rate, where the received data rate is different from the transmission data rate.

7. A modem apparatus comprising:

means for receiving data from a data terminal equipment for transmission to a far-end modem over a first time interval;

means for communicating the data over a full-duplex cellular communications channel to the far-end modem at a transmission data rate selected from a range of data rates, where the range has a lowest data rate and a highest data rate; and means for a) switching the transmission data rate to a low-speed data rate as a function of the amount of received data over the first time interval; and b) adapting the transmission data rate to the quality of the full-duplex communications channel;

wherein the adaptation is prohibited from increasing the transmission data rate beyond a first value as a function of the amount of received data over the first time interval, and where the first value is less than the highest data rate and greater then or equal to the low-speed data rate.

8. The apparatus of claim 7 wherein the means for switching and adapting switches to the low-speed data rate when no flow control is performed in the modem and the transmission data rate is greater than the low-speed data rate.

9. The apparatus of claim 8 wherein the means for switching and adapting is prohibited from increasing the data rate beyond the first value when no flow control is performed in the modem.

10. The apparatus of claim 7 wherein the means for switching and adapting switches to the low-speed data rate when the amount of received data over the first time interval is less than a first predetermined value and the transmission data rate is greater than the low-speed data rate.

11. The apparatus of claim 10 wherein the means for switching and adapting is prohibited from increasing the data rate beyond the first value when the amount of received data is less then the first predetermined value.

12. The apparatus of claim 7 wherein the means for communicating simultaneously receives a data signal from the far-end modem at a received data rate, where the received data rate is different from the transmission data rate.

* * * * *